(12) United States Patent
Comerford

(10) Patent No.: US 8,373,665 B2
(45) Date of Patent: Feb. 12, 2013

(54) INTERACTIVE DISPLAY DEVICE

(75) Inventor: Liam D. Comerford, Carmel, NY (US)

(73) Assignee: International Business Machines Corporation, Armonk, NY (US)

( * ) Notice: Subject to any disclaimer, the term of this patent is extended or adjusted under 35 U.S.C. 154(b) by 1440 days.

(21) Appl. No.: 11/828,685

(22) Filed: Jul. 26, 2007

(65) Prior Publication Data

US 2009/0027349 A1    Jan. 29, 2009

(51) Int. Cl.
*G06F 3/041* (2006.01)
(52) U.S. Cl. ......................................................... 345/173
(58) Field of Classification Search .................. 345/173, 345/168–169
See application file for complete search history.

(56) References Cited

U.S. PATENT DOCUMENTS

| | | |
|---|---|---|
| 5,410,334 A | 4/1995 | Comerford |
| 5,479,536 A | 12/1995 | Comerford |
| 6,271,835 B1 | 8/2001 | Hoeksma |
| 6,839,050 B2 | 1/2005 | Sakamaki et al. |
| 2002/0118175 A1* | 8/2002 | Liebenow et al. ............ 345/168 |
| 2003/0156100 A1 | 8/2003 | Gettemy |
| 2005/0166158 A1 | 7/2005 | Blanchard, III et al. |
| 2010/0188359 A1* | 7/2010 | Lee ............................... 345/174 |

* cited by examiner

*Primary Examiner* — Yong H Sim
(74) *Attorney, Agent, or Firm* — F. Chau & Associates, LLC; Anne V. Dougherty, Esq.

(57) ABSTRACT

Computing devices are disclosed which include a digitizer and a display, wherein the digitizer and the display are mounted on opposite surfaces of the device. For example, a computing device such as portable hand held device includes a display mounted on a front surface of the device and a digitizer is mounted on a rear surface of the device, wherein the digitizer receives a pointing action to be displayed on the display and wherein locations on a digitizer surface are mapped to locations on the display surface so that a user may easily indicate locations or objects on a screen without obscuring the user's view of the screen.

20 Claims, 10 Drawing Sheets

INTERACTIVE DISPLAY DEVICE

TECHNICAL FIELD

The present invention generally relates to interactive display devices for portable handheld computing devices and, in particular, interactive display systems for handheld computing devices that are implemented using a digitizer disposed on a bottom side of the computing device, wherein the digitizer is responsive to user finger contact to drive user interaction with a GUI (graphical user interface) displayed on display screen disposed on a top side of handheld device, thereby allowing the display screen to be un-obscured by a user's finger contact with the bottom side digitizer.

BACKGROUND

Interactive display devices such as touch screen displays and touch panel devices are commonly implemented with computing devices such as portable computers, cell phones, personal digital assistants (PDAs), and other hand held portable computing devices, to allow user interaction with the device or applications executed on the device using a display screen. A user can interact with the device or application by contacting a touch sensitive surface overlaying a display screen in predetermined regions (using a pointing device such as a stylus or other contact means such as finger contact) so as to select graphical objects displayed on a screen or input text, etc.

FIG. 1 schematically illustrates a computing device (10) having an interactive display device (100) with a conventional framework. The interactive display device (100) comprises a display unit (110) and a touch panel (120) (or digitizer) mounted on the front-side surface of a housing (130) of the computing device (10) with the digitizer (120) stacked as an overlay on the display unit (110). The digitizer (120) is a contact sensitive layer that can be designed using one or various known techniques and structures to detect motion, touch, position, etc. of an object such as a stylus, pen, pointing device, a human's finger, etc, in contact with the surface of the digitizer (120) and generate signals that causes a graphic cursor to be moved on the screen of the display unit (120). The display unit (110) may be a liquid crystal display (LCD), for example. Interactive touch screen display devices are used with graphical user interfaces so as to present users with depictions of controls and text that can be manipulated by user operated pointing devices to provide what is referred to as a "direct manipulation" user interface, as is known in the art. In order to support a "direct manipulation" user interface, the interactive display device (100) having a stacked, overlay framework as depicted in FIG. 1 must meet certain design criteria.

For instance, the digitizer (120) must be designed having a contact sensitive surface with a footprint that is at least the same size as (and aligned to) the footprint of the display screen of the display unit (110). The digitizer (120) must be constructed using transparent glass or rigid plastic materials so that displayed graphics, objects, etc. can be seen through the overlying digitizer (120). Moreover, to implement a "direct manipulation" user interface using the conventional interactive display device (100) of FIG. 1, the physical or synthetic resolution of the digitizer (120) must be sufficient (110) so that the position of the user contact on the overlying digitizer (120) relative to the position on the display screen (110) directly under the contact point can be determined with sufficient precision. Indeed, for finger contact designs, it is important to provide sufficient resolution that allows the user to accurately position a graphical cursor or otherwise select/active a graphical object or menu option displayed on the screen just below the user contact point. This precision detection is important for effective user operation for direct manipulation user interfaces where users expect to be able to interact with graphical objects, etc., directly below the point underlying the user's perceived contact point.

There are limitations and disadvantages associated with conventional interactive display devices having stacked frameworks, such as depicted in FIG. 1. For instance, the use of high resolution digitizers as required for direct manipulation user interactive display systems can be extremely costly in terms of manufacturing costs, as well as the complex system integration of hardware and software required for high-resolution digitizers. Furthermore, with a stacked interactive display framework of FIG. 1, the display unit (110) can be damaged as a result of repeated contact pressures that are generated when operating the touch screen overlay (120) with a stylus or fingertip, which can lead to a shortened lifespan of the display.

Furthermore, as portable computing devices are made increasing smaller with smaller screen sizes and more compact graphic user interfaces, interactive display devices with stacked frameworks as depicted in FIG. 1 pose practical limitations with regard to scaling screen size and user interface graphic content. Indeed, when a touch screen overlay is used, a user's fingers and/or a stylus will obscure part of the display as the user's finger or stylus is manipulated to make contact at a desired position. In this regard, it can be difficult for a user to make a selection of a target object on a small display screen having a densely packed graphical interface using fingertip contact, as the user's fingertip may cover more than a single control or selection. As such, graphic user interfaces must be designed to present relatively large interactive targets to accommodate the relatively large contact footprint of a user's finger and otherwise compensate for relative imprecision of the human finger as an input mode.

SUMMARY OF THE INVENTION

Exemplary embodiments of the invention include interactive display systems for handheld computing devices that are implemented using a digitizer disposed on a bottom side of the computing device, wherein the digitizer is responsive to user finger contact to drive user interaction with a GUI (graphical user interface) displayed on display screen disposed on a top side of handheld device, thereby allowing the display screen to be un-obscured by a user's finger contact with the bottom side digitizer.

One exemplary embodiment of the invention is a computing device including a device housing having a first side and a second side opposite the first side, and an interactive display system having a display and a digitizer. The display includes a display screen disposed on the first side of the device housing. The digitizer includes a contact surface disposed on the second side of the device housing, and the digitizer is configured to detect user contact at contact points on the contact surface to drive user interaction with a GUI (graphical user interface) displayed on the display screen.

In one exemplary embodiment, the contact surface comprises a plurality of contact sensors that define a two-dimensional array of contact points on the contact surface of the digitizer, where each contact point corresponds to X-Y coordinate in a coordinate space of the digitizer. The display screen and contact surface of the digitizer have footprints that are substantially similar in area and are disposed in alignment on the opposing first and second sides of the device housing.

The resolution of contact points on the contact surface of the digitizer may be less than a resolution of pixels of the display.

The computing device further includes a sensor circuit and an embedded processing system. The sensor circuit senses user contact with one or more contact sensors of the digitizer and which outputs a detection signal that indicates user contact at one or more detected contact points in the image space of the digitizer. The embedded processing system processes the detection signal to map coordinates of the detected contact points into one or more corresponding display screen coordinates in an image space of the display screen and generates a display control signal, which is processed by the display, to enable user interaction with a graphical user interface displayed in a corresponding region of the display screen. The display control signal may be processed to enable user control of a graphical cursor that is displayed on the display screen at the corresponding display screen coordinates and/or enable user selection of a graphical object of the graphical user interface that is displayed on the display screen at the corresponding display screen coordinates.

In another exemplary embodiment, the digitizer of the computing device may include a touch panel, a plurality of conductive contact sensing electrodes, and a sensing circuit. The touch panel is formed of non-conductive material, and has first and second opposing surfaces where the first surface defines the contact surface of the digitizer. The plurality of conductive contact sensing electrodes include first contact electrodes and one or more second contact electrodes. The first contact electrodes are arranged on the first surface of the touch panel at discrete contact points on the contact surface of the digitizer. The sensing circuit senses user contact with one or more first contact electrodes at discrete contact points on the contact surface of the digitizer by detecting electrical connections that are induced by simultaneous user contact with the one or more first contact electrodes type electrodes and at least one second-type electrode. The second contact electrodes may be arranged on the first surface of the touch panel in proximity to the first contact electrodes and/or disposed on a surface of the device housing such that the one or more second electrodes are in physical contact with a user's hand when using the computing device.

The sensing circuit senses user contact with a first contact electrode by detecting a change in voltage on the first contact electrode from a first reference voltage level to a second voltage reference level due to an electrical connection induced by simultaneous user contact with the first contact electrode and a second-type electrode.

The first contact electrodes may be uniformly arranged in two-dimensional array over the contact surface of the digitizer, arranged in one or more separate linear arrays on the contact surface of the digitizer, arranged in one or more separate annular rings on the contact surface of the digitizer, and/or arranged at discrete contact points on the contact surface of the digitizer such that one or more of the first contact electrodes are directly aligned to a graphical objected that is displayed in corresponding region of the display screen on the opposing first surface of the device housing.

In one exemplary embodiment of the invention, the digitizer is a unitary device that is mounted to the device housing of the computing device. In another exemplary embodiment, the digitizer may be integrally formed as part of the computing device wherein the touch panel is formed from a portion of the device housing, wherein the first contact electrodes are, e.g., conductive studs that are embedded in the touch panel portion of the device housing, wherein end portions of the conductive studs are exposed at the contact points on the contact surface of the digitizer.

These and other exemplary embodiments, aspects, features and advantages of the present invention will be described or become apparent from the following detailed description of exemplary embodiments, which is to be read in connection with the accompanying drawings.

DETAILED DESCRIPTION OF EXEMPLARY EMBODIMENTS

Figure 1:
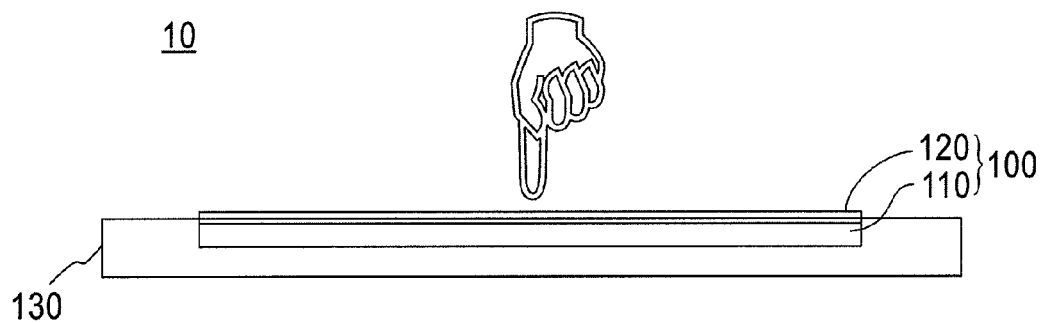
FIG. 1 is a cross-sectional schematic view of a computing device having a conventional interactive display system.
Figure 2A:
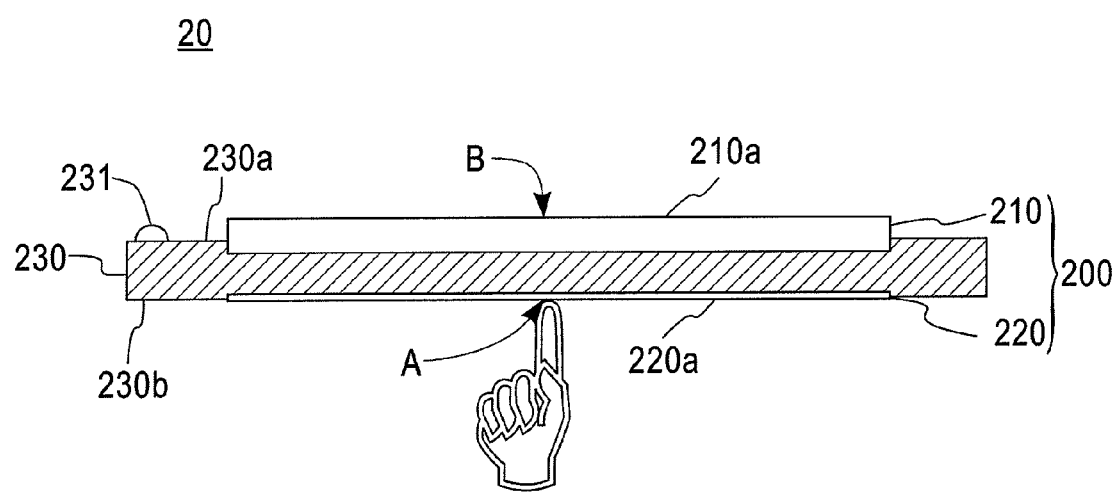
FIG. 2A is a cross-sectional schematic view of a computing device having an interactive display system according to an exemplary embodiment of the invention.
Figure 2B:
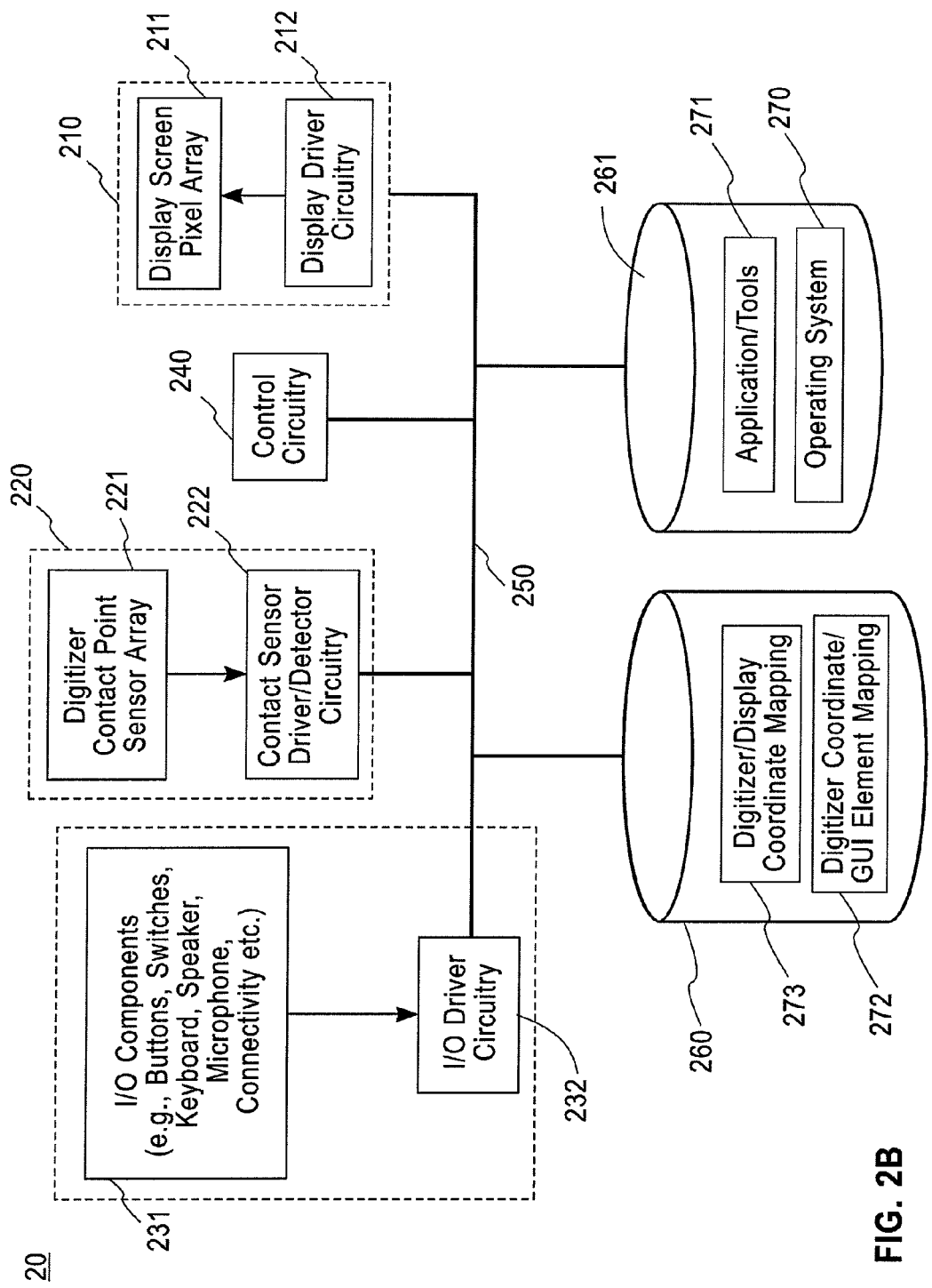
FIG. 2B is a block diagram of a computing device having an interactive display system according to an exemplary embodiment of the invention.

FIGS. 2A and 2B schematically illustrate a computing device having an interactive display system according to an exemplary embodiment of the invention. In general, FIG. 2A a schematic side-view illustration of a computing device (20) comprising an interactive display system (200) having a display unit (210) and touch sensitive input device (220) (or "digitizer") disposed on opposite sides of a device housing (230) of the computing device (20). FIG. 2A depicts an exemplary framework in which the display unit (210) is disposed on a front-side (230a) of the device housing (230) and the digitizer (220) is disposed on a back-side (230b) of the device housing (230) opposite the front-side. The digitizer (220) includes a touch-sensitive surface (220a) and the display unit (210) includes a display screen (210a), which face in opposite directions. The interactive display device (200) is generally configured such that a user can interact (via physical finger contact) with the bottom-side contact-sensitive surface (220a) of the digitizer (220) to control cursor movement on the display screen (210a) and/or otherwise point/select graphical objects displayed on the screen (210a) of display unit (210). With the interactive display arrangement/framework, the contact sensitive surface (220a) of the digitizer (220) does not overlay the display screen (210a) of the display unit (210), as in a conventional overlay arrangement as depicted in FIG. 1. As such, the user's view of the top-side display screen (210a) is not obscured by user interaction (finger contact) with the bottom-side digitizer (220).

FIG. 2A illustrates a conceptual structural framework for integrating an interactive display system with a computing device that may be one of various types of handheld, portable computing devices such as, for example, a pneumonic device (e.g., PDA or PIM managing device), a communication device (e.g., cell phone), remote controls, or other types of thin, handheld computing devices in which interactive display systems are required or desirable. It is to be understood that the term "computing device" is intended to broadly refer to any member of a class of devices employing embedded computing systems to provide all or part of their functionality. Depending on the application, the computing device (20) may have additional user interface I/O components (231) such as buttons, key pads, microphone/speaker, etc. disposed on the top-side (230a) of the device housing (230). FIG. 2B is a schematic block diagram that illustrates a general system architecture of hardware and software components of the computing device (20) according to an exemplary embodiment of the invention, which may be used to implement and control operation of the interactive display system (200) and other functions of the computing device (20) and to otherwise enable user interaction with the computing device (20). It is to be understood that the computing device architecture depicted in FIG. 2B can vary depending on the application—the computing device (20) may be equipped with various types of Input/Output (I/O) components and other electronic and mechanical components needed to support the intended function(s) of the computing device (20).

As depicted in FIG. 2B, the display unit (210) generally includes hardware components including a pixel array (211) forming the display screen and display driver circuitry (212) to control operation of the pixel array (211), which will vary in architecture and function depending on the type of display system implemented. For instance, the display system (210) may be, e.g., an LCD (liquid crystal display), a plasma display, a florescent panel display or an LED display, for example, or other suitable conventional or state of the art display systems. Moreover, the digitizer (220) generally comprises an array or pattern of contact point sensors (221) that are formed as part of the touch sensitive surface (220a) of the digitizer (220) and contact sensor driver/detection circuitry (222) to control sensor functions and otherwise detect the occurrence and location of physical contact to locations on the contact sensitive surface (220a) of the digitizer (200). The various hardware components of the digitizer (200) will vary in architecture and function depending on the type of digitizer implanted. For instance, the digitizer (220) may be implemented using any conventional or state of the art digitizer technologies that are suitable for the given back-side application, such as resistive or capacitive touch panel technologies and other technologies that may be used for sensing finger contact. Moreover, the digitizer (220) may be implemented using one of various low cost, low resolution digitizer device framework according to exemplary embodiment of the invention, such as those that will be discussed in further detail below with reference to FIGS. 3A~3B, 4, and 10-14, for example.

As further depicted in FIG. 2B, the computing device (20) may comprises one or more types of I/O components (231) and associated driver circuitry (232) to control operation of device functions or otherwise support interaction with one or more applications that are executed by the computing device (20). The computing device (20) includes control circuitry (240) that is operatively coupled to the various hardware components (210) (220) (231)/(232) over a communications bus (250). The control circuitry (240) may include one or more computer processors, microprocessors, and/or ASICs (application specific integrated devices), etc, may be needed to control operation of the display system (210) and digitizer (220) and other I/O components (231).

The computing device (20) comprises one or more different types of embedded memory (260), (261) (e.g., ROM and/or programmable ROM such as FLASH ROM memory) for storing program code/software such as an operating system (270) to operate the computing device (20) and software applications/tools (271) that are hosted by the computing device (20). The various programs (270) and (271) may include program code for rendering graphical user interfaces via the display system (210) that allow user interaction and control of functionalities of the computing device (20) and/or applications (271) executed by the computing device (20).

Moreover, the computing device (20) includes software and configuration data that is executed by the control system (240) to support the interactive display system (200). For instance, the computing device (20) may include software programs or methods (272) and (273) that allow mapping of the coordinates of user contact locations in the digitizer space to the display screen coordinates in the display pixel space, and/or allow mapping of the coordinates of user contact location in the digitizer space to corresponding graphical element that are displayed on the display screen. By way of specific example, the software programs (272) and (273) may include computer implemented methods according to exemplary embodiments of the invention such as those illustrated by the flow diagrams of FIGS. 8 and 9, as will be discussed in further detail below.

As noted above, FIGS. 2A and 2B illustrates a conceptual structural framework for integrating an interactive display system with a handheld computing device, where the digitizer (220) can be implemented using any suitable conventional or state of the art digitizer technologies. It is to be appreciated, however, that the exemplary arrangement of the interactive display system (200) with the digitizer (220) disposed on the bottom-side of the device (20) behind and facing away from the display system (210) allows for the implementation of low cost, simplified digitizer designs for various applications including direct manipulation user interface, exemplary embodiments of which will be described in detail below. For instance, with back-side mounting, the digitizer (220) does not have to be made transparent to allow a user to view the screen, or otherwise have a contact surface with a footprint matched to the footprint of the display screen to allow for direct manipulation user interface applications. In fact, the mounting location of back-side digitizer (220) can be selected to approximate the corresponding location opposite that of the top-side device display (210) so that when the user operates the digitizer (220), the user may experience the feeling of, effectively, pointing through the thickness of the device (20) to a location on the display screen (210a) on the front-side of the device housing (230).

By way of specific example, in the exemplary embodiment of FIG. 2A, the digitizer (220) is shown mounted on the bottom-side of the computing device (20) in alignment with the display (210) on the top-side of the computing device (20), where the digitizer (220) and display (210) may have the same or substantially similar footprint size. With this arrangement, when the user operates the digitizer (220) by finger contact at point A on the contact surface (220a) of the digitizer (220), a graphical pointer or cursor may be displayed at point B on the display screen (210) aligned to substantially the same location directly opposite the point of contact A of the fingertip on the touch panel digitizer (220). However, in other exemplary embodiments, where the footprints of the digitizer contact surface (220a) and display screen (210a) are different and/or not directly aligned on opposite sides of the device housing (230), the user can determine the correspondence between the finger point of contact on the digitizer contact surface (220a) and the corresponding location on the display screen (210a) as indicated by movement and/location of the on-screen pointer or cursor.

In this regard, irrespective of whether or not the footprints of the display screen (210a) and contact sensitive surface (220a) are closely matched in size and aligned on opposing top and bottom side surfaces of the device housing (230), the pointing location of the visual pointer or cursor as displayed on the display screen (210a) will dominate the user's kinesthetic sense of the location on the display screen (210a) being pointed to as the user interacts with the digitizer (220) via finger contact. In other words, for direct manipulation user interfaces, the user will focus his/her view on the movement of the cursor displayed on the top-side screen (210a) as the user manipulates finger contact with the bottom-side digitizer (220), and thus, not be confused by any lack of correspondence/misalignment between the finger contact locations on the backside digitizer surface (220a) and the cursor/pointer locations on the top side display screen (210a). Consequently, for back-side digitizer arrangements such as depicted in FIG. 2A, the resolution of the digitizer (220) can be made significantly lower than that of the display (210). This is in contrast to conventional overlay designs as in FIG. 1 where the resolution of the digitizer (120) should approximate or exceed the resolution of the display (110) so that the locations of the screen cursor and user finger contact to coincide for effective, user friendly direct manipulation interface applications.

Figure 3A:
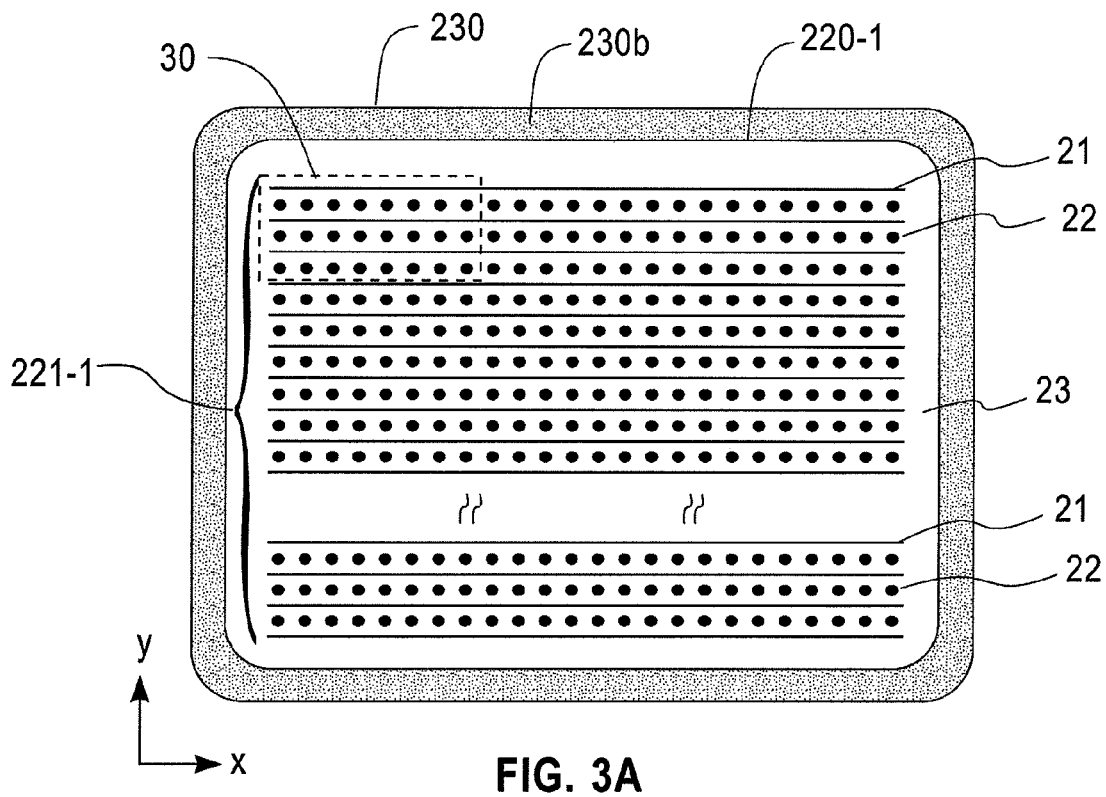
FIGS. 3A and 3B schematically illustrate a digitizer according to an exemplary embodiment of the invention
Figure 3B:
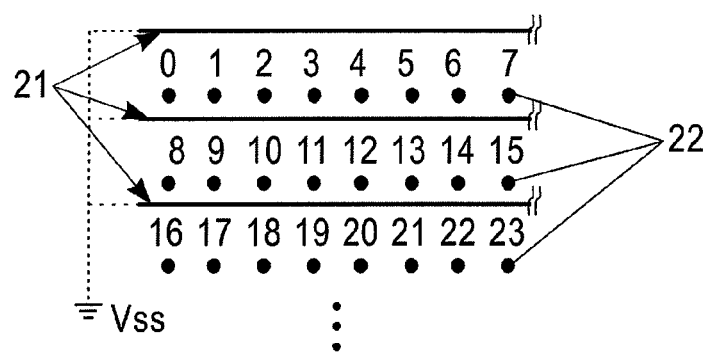

For example, FIGS. 3A and 3B schematically illustrate a digitizer (220_1) according to an exemplary embodiment of the invention, which may be implemented as the bottom-side digitizer (220) in the interactive display system (200) of FIG. 2A. For purposes of illustration, FIG. 3A can be considered a schematic bottom plan view of the computing device (20) in FIG. 2A showing the exemplary digitizer (220_1) disposed on the bottom-side (230b) of the device housing (230). The digitizer (220_1) comprises an array (221_1) of conductive electrodes comprising first type electrodes (21) and second type electrodes (22), which are formed on, embedded in, or otherwise exposed on a contact surface (23) of the digitizer (220_1). In the exemplary embodiment, the conductive electrodes (21), (22) are depicted as being arranged in a 2D array (221_1) of contact point electrodes (22) and elongated rail electrodes (21) interposed between each row of contact point electrodes (22). In the illustrative embodiment, each contact point electrode (22) in the 2D array (221_1) of electrodes corresponds to (or is otherwise mapped to) a distinct X-Y coordinate of a 2D array of contact points in digitizer coordinate space.

The digitizer (220_1) is configured to detect and interpret user contact on locations corresponding to the contact point electrodes (22) by sensing electrical connections between the contact point electrode (22) and a portion of at least one conductive rail electrode (21) in proximity to the contact point electrode (22), which electrical connections are induced when a user's finger physically contacts the contact point electrode (22) and conductive rail electrode (21) at the same time. The digitizer (220_1) operates to detect finger contact at one or more of the contact points on the contact-sensitive surface (23) (as delineated by the contact point electrodes (22)) using sensing circuitry that is electrically interconnected to the contact point electrodes (22) and the conductive rail electrodes (21). For instance, FIG. 3B illustrates a block (30) of 24 contact point electrodes (22)) in the digitizer array (221_1) comprising an array of 8×3 contact points disposed between conductive rail electrodes (221) which are connected to a ground supply voltage VSS. During normal operation, the contact point electrodes (22) can be connected to any suitable sensing circuitry that can sense instances when one or more contact point electrodes (22) are pulled down to the VSS voltage level (from a higher voltage level) by virtue of physical contact between the contact point electrodes (22) and a grounded conductive rail electrode (21). The sensing circuitry can be configured to sense a binary state (contact, no contact) of each contact point electrode (22) at a given time based on the voltage level of the contact point electrode (22), where the sensed state of each contact point electrode (22) can be represented by one bit of information in the array (221_1) or for a given sub-array (30).

Figure 4:
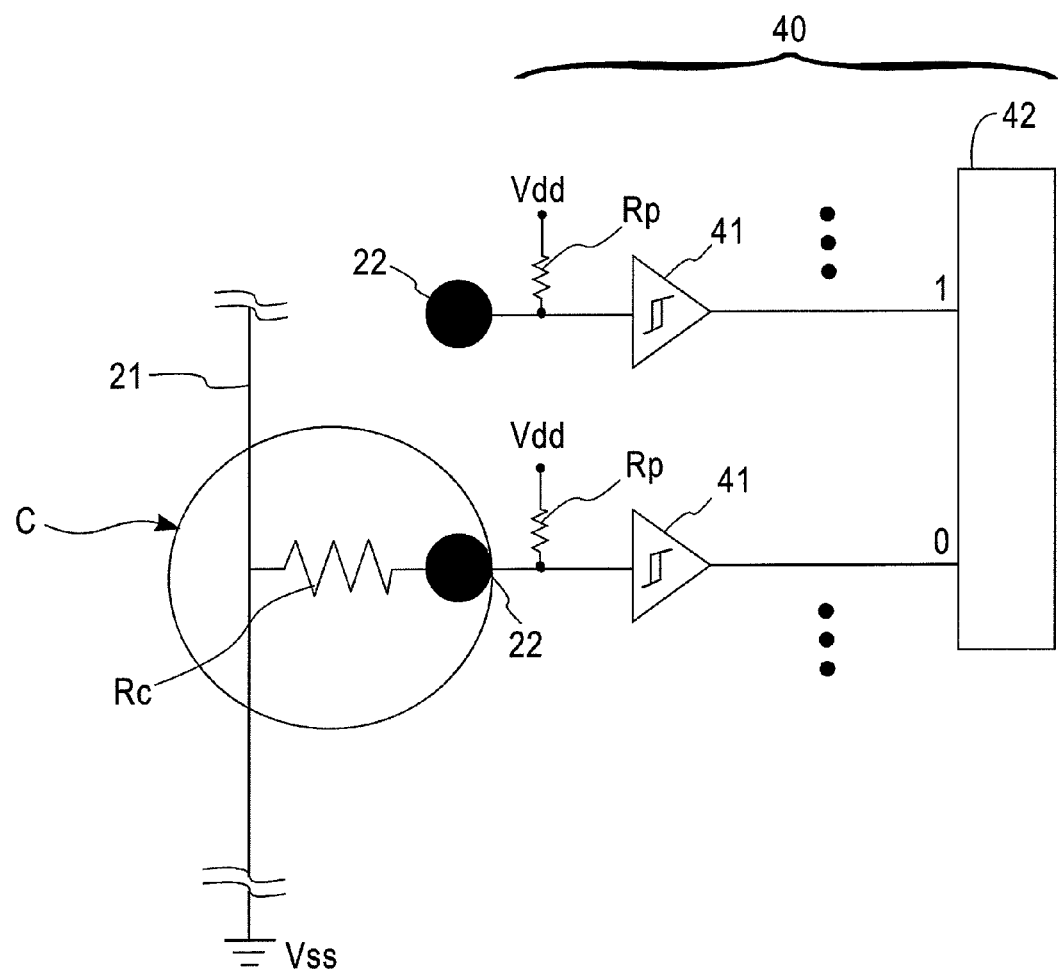
FIG. 4 is a schematic circuit diagram illustrating contact sensor circuitry according to an exemplary embodiment of the invention.

FIG. 4 is a schematic circuit diagram illustrating a contact sensor circuit (40) according to an exemplary embodiment of the invention. FIG. 4 illustrates one exemplary embodiment for implementing the contact sensor driver/detector circuitry (222) of FIG. 2B for a digitizer contact point sensor array (221) implemented using the sensor array (221_1) of FIG. 3A, for example, to sense finger contact at contact points on the touch sensitive surface of the digitizer array. In general, the sensor circuit (40) comprises a plurality of buffers (41) (e.g., Schmitt triggers), pull-up resistors Rp and a detector circuitry (42). The input of each buffer (41) is connected to a corresponding one of the contacts (22) in the digitizer array (221_1). Moreover, the input of each buffer (41) is connected to a first power supply voltage (e.g., Vdd) through a corresponding pull-up resistor Rp. The output of each buffer (41) is coupled to an input of the detector (42). The conductive rail electrode (21) is connected to a second power supply voltage (e.g., Vss). The sensor circuit (40) generally operates by detecting instance in which electrical connections are made between a contact point electrode (22) and a ground rail (21) by virtue of user contact in proximity to the contact points.

In particular, in the absence of contact to a given contact point electrode (22) by a user finger, the input of the corresponding buffer (41) will be held at logic "1" (Vdd). However, as depicted in FIG. 4, when finger contact (C) is made between a contact point (22) and the ground rail (21), a high resistance RC electrical contact is formed between the contact electrode (22) and the conductive rail (21) (e.g., contact resistance RC in FIG. 4) causing the input to the corresponding buffer (41) to be pulled down below some triggering voltage threshold by virtue of the voltage divider circuit formed by Rp and Rc. As a result, the output of the buffer (41) changes from a logic "1" state to a logic "0" state. The output of each buffer (41) is input to the detector circuit (42), where it is stored and processed. The detector (42) may be the control system (240) or part of the control system (240) depicted in FIG. 2B, having an n-bit register that temporarily stores a n-bit digital word that represents the contact state for a block of contact point sensors (22) in the array (221_1).

For instance, in the exemplary embodiment of FIGS. 3A and 3B, where each contact point electrode (22) represent a given X-Y position in the digitizer array (221_1), and where the contact point electrodes (22) are divided into sub-blocks (30) of 24 contacts over the array (221_1), the state of the contact point electrodes (22) can be represented by a 24-bit digital word for each block (30) of contact point electrodes (22), where state and position of a given contact point electrode (22) in the block (30) can be represented by the logic value and bit position of the corresponding bit in the n-bit word.

For instance, in the exemplary embodiment of FIG. 3B, where the array of contact point electrodes (22) are grouped into blocks (30) of 8×3 contact point, each contact point electrode (22) for a given block (30) can be represented by one bit in a 24 bit word where the bit position (0 . . . 23) specifies the X_Y position of the contact point in the sub array (30) and the logic value represent the sensed state of the contact point electrode (22). It is to be understood that FIGS. 3A and 3B merely illustrate one exemplary grouping, but that the contact point electrodes (22) in the digitizer array can be grouped in any desired arrangement (e.g., line by line, column by column, etc) with any desired number n of points represented by an n-bit digital word, e.g., n–8, 16, 32, 64, based on the data width of the processor, etc. The n-bit word for s given unit cell region (30) could be read and processed by the detector system (42) (or an operating system or an application) and decoded as a reference to a particular region on the corresponding display screen. The corresponding region on the display screen could be determined the appropriate software programs (e.g., 272, 273 in FIG. 2B) to correspond to a closest graphical element on the display, taking size and aspect ratio differences between the digitizer and the display into account.

Figure 5A:
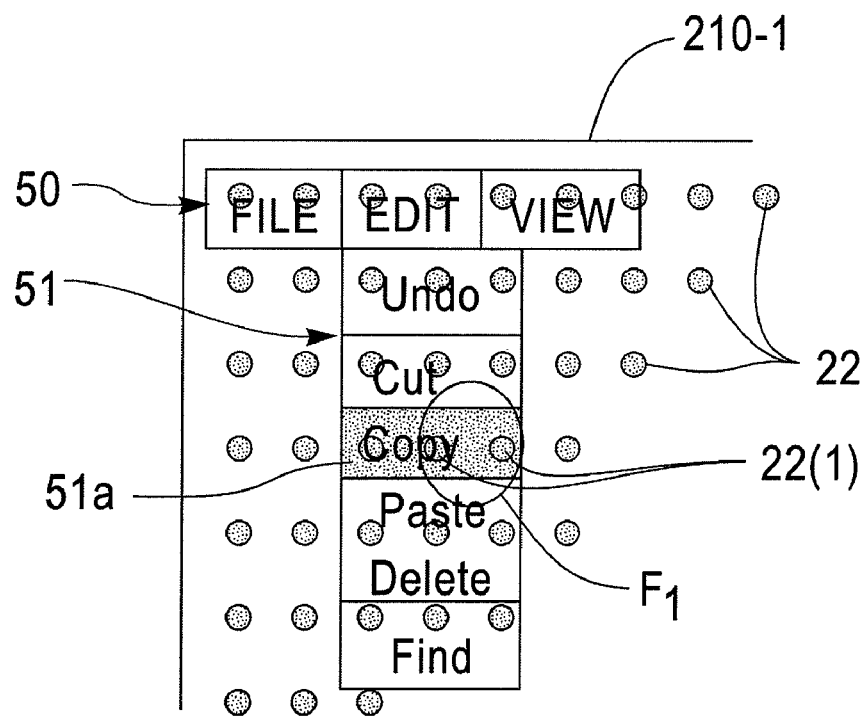
FIGS. 5A-5B schematically illustrate methods for mapping contact locations on a bottom-side mounted low resolution digitizer to graphical objects displayed on a front-side display screen, according to an exemplary embodiment of the invention.
Figure 5B:
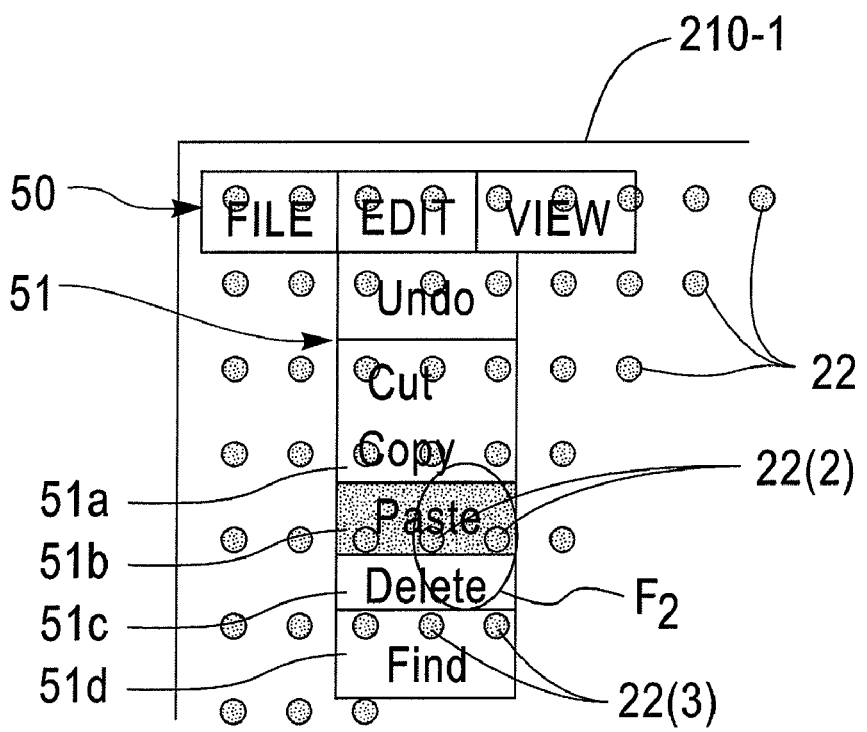

By way of example, FIGS. 5A and 5B schematically illustrate methods for mapping contact locations on a bottom-side mounted low resolution digitizer to graphical objects displayed on a front-side display screen, according to an exemplary embodiment of the invention. In particular, FIG. 5A illustrates an exemplary GUI displayed on a front-side display screen (210_1) where the GUI includes a pull-down menu object (50) and menu options (51) for a selected "edit" menu item. Moreover, FIG. 5A illustrates an array of contact point electrodes (22) aligned to the front-side GUI elements, where the contact electrodes (22) may be part of the exemplary digitizer array (221_1) of FIG. 3A which is disposed on a backside of a computing device aligned to the front side display (210_1). FIG. 5A further illustrates a location of a finger contact F1 on the backside digitizer, which location is primarily below a "copy" item (51a) which is aligned to contact point electrodes (22_1). In this example, contact points (22_1) are aligned to the "copy" graphical object. If the digitizer sensing circuitry detects contact at these points (22_1), the mapping software would map the low resolution contact array points to the display region aligned to the "copy" item (51a).

Moreover, FIG. 5B illustrates a state in which the fingertip contact has been moved to location F2, where contact is made to contact point electrodes (22_2). In this example, the location of the sensed contact points (22_2) would be mapped to the region of the display screen in which a "paste" item (51b) is displayed. It should be noted that in FIGS. 5A and 5B, a "delete" item (51c) is not specifically aligned to any bottom side contact point electrode (22). In other words, there are no digitizer locations within the isomorphic boundaries of the graphical representation (51c). However, a user intention to select the "delete" item (51c) can be determined using the mapping software when the finger contact is made to contact electrode (22_2) and (22_3) as denoted in FIG. 3. Indeed, in this circumstance, given the alignment of contacts (22_2) to the "paste" item (51b) and the alignment of the contacts (22_3) to a "find" element (51d), the system could determine that sensing simultaneous contact at points (22_2 and 22_3) corresponds the graphical object "delete" (51c) located between paste (51b) and "find" (51d).

It to be noted that the exemplary digitizer framework of FIGS. 3A/3B is merely one exemplary embodiment of a low resolution digitizer having a 2D array of contact points that are uniformly distributed over a footprint area of the digitizer array (221_1), where the footprint of the digitizer array (221_1) is substantially the same as the footprint of the top-side display screen (210_1). FIGS. 5A/5B illustrate the use of the low-resolution digitizer (220_1) with on-screen objects such as graphical buttons or list entries that may or may not be directly aligned to locations of the contact point electrodes (22) on the bottom side digitizer. In this implementation, digitizer resolution cannot be lower than the resolution sufficient to distinguish between on-screen objects. For example, if the display (210) has a display screen with a footprint sufficient to display an array of n×m objects, the resolution of the digitizer contact points should be sufficient to provide a minimum of n×m discrete digitization values. As will be explained below, when the resolution of the digitizer is lower than the resolution of the display, a process may be used to compensate for these differences in resolution by processing the digitizer input as an approximation.

Figure 6:
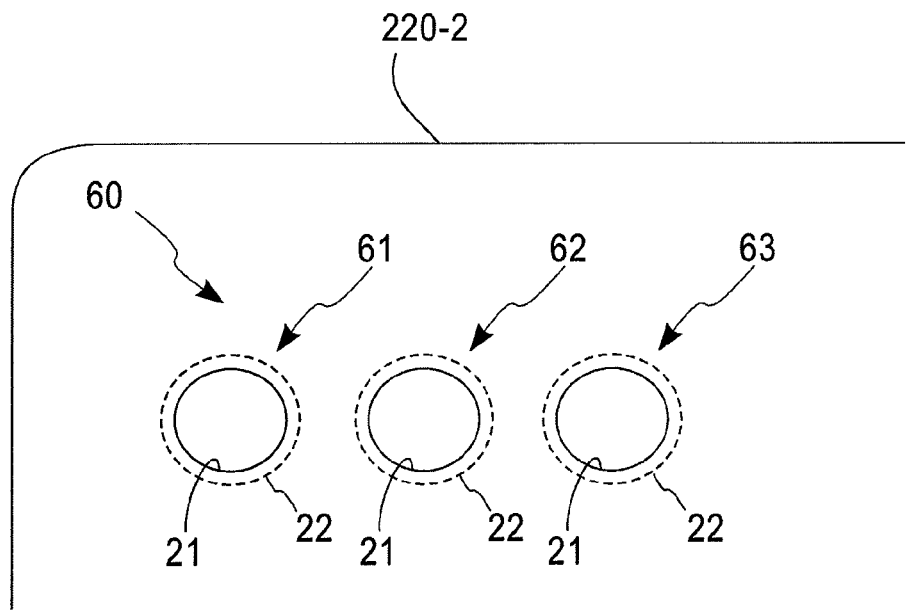
FIG. 6 is a schematic illustration of a digitizer comprising an arrangement of rotary slider contacts, according to another exemplary embodiment of the invention.
Figure 7:
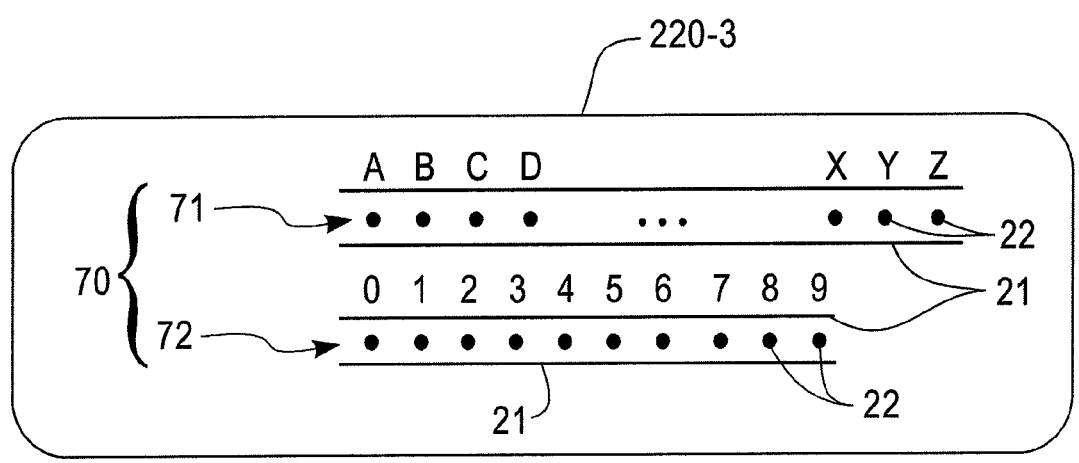
FIG. 7 is a schematic illustration of a digitizer comprising a plurality of linear slider contacts according to another exemplary embodiment of the invention.

FIGS. 6 and 7 illustrate digitizer frameworks according to other exemplary embodiments of the invention. In particular, FIG. 6 illustrates a digitizer (220_2) according to an exemplary embodiment of the invention having an contact array (60) comprising a plurality of rotary slider contacts (61, 62 and 63). Each rotary slider contact comprises an inner annular conductive ring electrode (21) and an outer ring of contact point electrodes (22). With this contact sensor arrangement, the digitizer (220_2) may comprise sensor circuitry that not only detects electrical connections between the contact electrodes (22) and the inner annular ring (21) electrode induced by finger contact (such as described above with reference to FIG. 4), but also sense the direction (counter clockwise, counter clockwise) of sequential contact between the contacts (22) and ring electrode (21). In this regard, each rotary slider contact (61)~(63) can be used to increase or decrease the value/level of some system operating parameter or toggle back and forth through a list of menu items associated with the given rotary contact.

For example, the rotary slider contacts (61), (62) and (63) may be used as separate controls to selectively adjust brightness, contrast and Hue settings, respectively, of the topside display screen, where clockwise rotation of finger contact around a given one of the rotary contacts (60) will increase the level of the associated display setting and where counter-clockwise rotation of finger contact will decrease the level. For example, the rotary contacts 61, 62 and 63 may be separate controls to select and adjust display settings brightness, contrast, and Hue settings, respectively, of the topside display screen, where clockwise contact rotation increases the setting level and counterclockwise contact rotation decreases the setting level. In other embodiments, the rotary slider contacts (61), (62), and (63) may be used as separate controls to select specific menu items, e.g., letters, numbers, symbols, etc, and scroll back and forth through a list of items for each menu items based on the direction of contact rotation. For example, in messaging applications or e-mail applications, a user may be able to compose a message by using the rotary slider (61) to select a menu option for English language characters (A~Z) and scroll through the list of available letters to sequentially select letters to compose a message.

Moreover, FIG. 7 illustrates a digitizer (220_3) according to an exemplary embodiment of the invention having a contact array (70) comprising a plurality of linear slider contacts (71, 72). Each linear contact slider comprises a linear array of contact point electrode (22) interposed between a pair of elongated conductive rail electrodes (21). With this contact sensor arrangement, the digitizer (220_3) may comprise sensor circuitry that not only detects electrical connections between the contact electrodes (22) and the elongated conductive rails (21) induced by finger contact (such as described above with reference to FIG. 4), but also sense the direction (left, right) of sequential contact between the contacts (22) and rail electrode (21). In this regard, each linear slider contact (71) and (72) can be used to increase or decrease the value/level of some system operating parameter or toggle back and forth through a list of menu items associated with the given rotary contact, such as described above with reference to FIG. 6.

For example, as specifically depicted in FIG. 7, the linear slider contacts (71) and (72) may be used as separate controls to select letter and number menu items, respectively, and scroll back and forth through a list of items for each menu items based on the direction of contact detection. For example, in messaging applications or e-mail applications, a user may be able to compose a message by using the linear slider (71) to select a menu option for English language characters (A~Z) and scroll through the list of available letters to sequentially select letters to compose a message. The linear slider (71) may comprise a contact point electrode (22) for each character such that a desired letter can be directly selected by touching the corresponding contact (22). Similarly, the linear slider (72) may be used to select a menu option for numbers (0~9) and scroll through the list of available numeric characters to sequentially select letters to compose a message. The linear slider (72) may comprise a contact point electrode (22) for each available numeric character such that a desired number can be directly selected by touching the corresponding contact (22).

It is to be appreciated that the digitizers of FIGS. 6 and 7 do not have to be disposed on the bottom side of a computing device opposite a display screen. Indeed, the exemplary digitizer devices (220_2) and (220_3) may be disposed on a front side of the computing device adjacent the screen display, wherein the rotary slider controls (60) and/or linear slider controls (70) are implemented as dedicated controls to select menu items or control system settings as discussed above. In such embodiments, the slider controls (60) and (70) need not be mounted on the bottom side in alignment to topside displayed GUI objects, as the user would have a priori knowledge of the corresponding control functions. In this regard, the exemplary slider control frameworks of FIGS. 6 and 7 provide low cost digitizer solutions that may be used in various applications and device architectures as control switches.

In other words, the digitizers of FIGS. 6 and 7 can be implemented backside, but not aligned to a graphical object, or can be mounted front-side or on the side of a computing device, to provide a low cost digitizer input control. The slider controls (60) and 70) may be part of digitizer devices disposed on the bottom-side of a computing device, where the slider controls are arranged to correspond to particular arrangement of graphical user interface objects displayed on a top-side display screen.

It is to be appreciated that low cost digitizer devices according to exemplary embodiments of the invention can be designed with varying architectures. For instance, since a digitizer is not located between the display and the user, it doesn't have to be flat. Texture can contribute feedback to the user experience. The contact electrodes (21) and (22) of the digitizer sensors may be slightly raised above the touch surface to provide tactile feedback to a user. Further, the ground rail electrodes may be positioned at other surface regions of the computing device and not disposed in proximity to the contact point electrodes on the contact surface of the digitizer.

For instance, one or more conductive ground electrodes may be strategically placed on the top-side surface, side surface and/or bottom side surface of the computing device, separately disposed from the digitizer touch surface, such that a user's hand is in contact with the ground rail(s) by virtue of handling the computing device. In this manner, when the user make finger contact to contact point electrodes (22) on the digitizers, an electrical connection is made by virtue of the user's hand being in simultaneous contact with the ground rails and one or more contact point electrodes (22).

As noted above, various methods are included to map contact locations on the digitizer to corresponding regions of the display screen. In accordance with exemplary embodiments of the invention, methods for mapping between digitizer and display coordinates are designed in consideration of differences in resolution between digitizer contact locations and pixels of a display screen and/or differences in orientation of the topside display screen and bottom side digitizer. More specifically, with regard to differences in resolution, methods for mapping contact locations to display screen locations compensate for differences between the larger granularity of contact points and the finer granularity of display pixels by processing the digitizer inputs as an approximation (e.g., snapping to targets or with "gravity" to targets). For instance, a digitizer coordinate pair may be amended to equal the nearest corresponding display screen pixel coordinate pair. The digitizer coordinate pair may be amended to equal a coordinate pair in the graphical user interface object most nearly corresponding to the pointing location. Mapping between the low-resolution digitizer contact locations and display screen pixels or graphical objects may be tabular or algorithmic.

Moreover, with regard to differences in orientation, when conventional off-the-shelf digitizer hardware is implemented bottom side for an interactive display system according to the invention, mapping routines are included to invert the value of the horizontal output to match the display. In other words, when the right side of the digitizer array corresponds to the left side of the display screen, the output of a conventional digitizer must be modified to compensate for this difference in orientation. For example, in the illustrative embodiment of FIG. 2A, as the user fingertip moves from left to right from the digitizer's perspective, a graphical pointer on the display will move from right to left from the display's perspective. The vertical coordinates do not have to be inverted as the direction of vertical movement (up, down) is the same from the perspective of the display and the digitizer.

Figure 8:
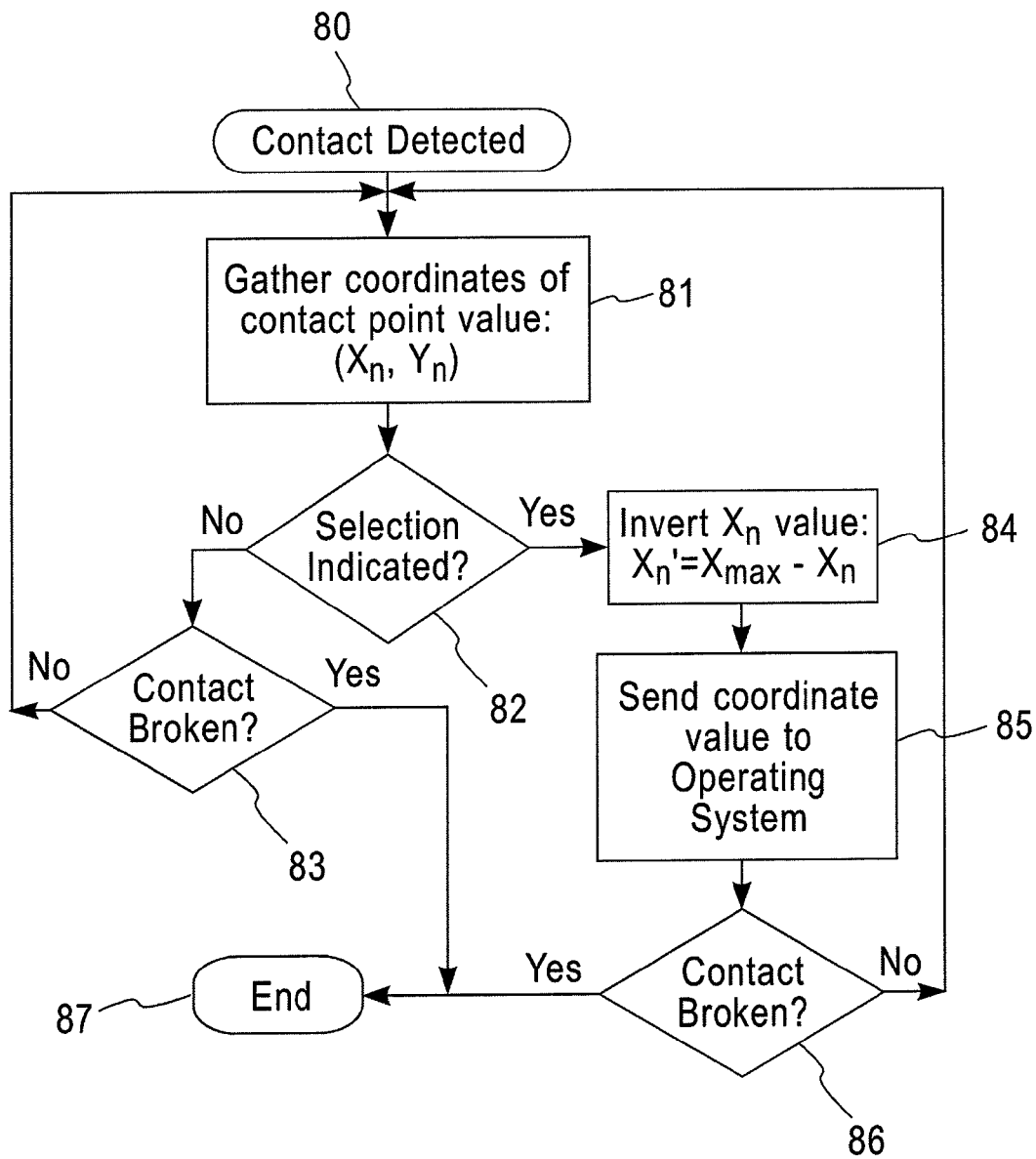
FIG. 8 is a flow diagram of a method for detecting and mapping discrete digitizer contact locations to a cursor location on a display screen, according to an exemplary embodiment of the present invention.
Figure 9:
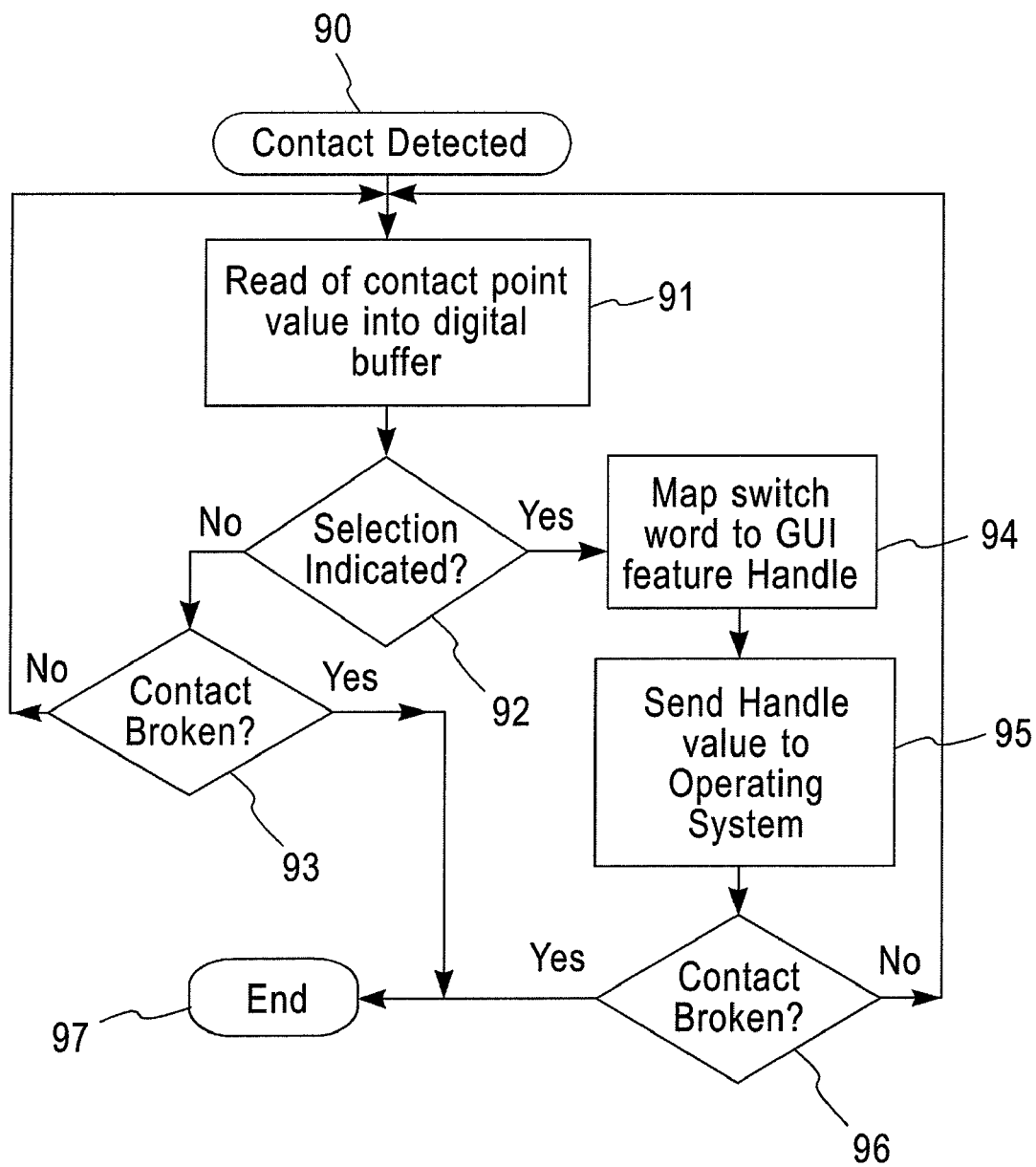
FIG. 9 is a flow diagram of a method for detecting and mapping discrete digitizer contact locations to graphical objects on a display screen according to an exemplary embodiment of the present invention.

Exemplary methods for mapping digitizer and display coordinates and enabling user interaction will now be discussed with reference to the exemplary methods of FIGS. 8 and 9. FIG. 8 is a flow diagram that illustrates a method for detecting and mapping discrete digitizer contact locations to cursor locations on a display screen, according to an exemplary embodiment of the present invention. In particular, the flow diagram of FIG. 8 illustrates an exemplary process of mapping digitizer contact locations to pixels of the display screen. FIG. 9 is a flow diagram that illustrates a method for detecting and mapping discrete digitizer contact locations to graphical objects (e.g., files, icons, etc.), according to an exemplary embodiment of the present invention. An exemplary process for mapping digitizer contact locations to display screen pixels can be implemented using an algorithmic process that does not change according to what application is active, whereas an exemplary process of mapping digitizer locations to graphical objects can be implemented using table look-up and management methods in which the mapping dynamically varies based on changes the graphical objects (features) currently displayed.

An exemplary process for detecting and mapping discrete digitizer contact locations to pixels according to an exemplary embodiment will now be discussed in further detail with reference to FIG. 8. As a user manipulates the computing device and contacts the touch sensitive surface of a digitizer, the digitizer sensor circuitry operates to detect finger contact at one or more contact locations on the touch sensitive surface of the digitizer (step 80) using methods as discussed above with reference to FIG. 4, for example, and determine the coordinates (Xn, Yn) of the contact location(s) in the reference frame of the digitizer (step 81). The contact locations are continuously tracked while no user selection event has been generated (negative result in step 82) and the user continues to make contact with the digitizer (affirmative result in step 83). A user selection event may be a selection signal that is generated by pressing a device button or tapping the digitizer with a pointing object, or other selection mechanism. A selection (i.e., moving focus to the option under the pointer) may be performed by pressing a standard button (not shown) or by other operations such as tapping the digitizer or lifting the fingertip from the digitizer. It should be understood that the methods for activating an indicated application depends on the particular structure and design choices created by the device designer.

When a user selection event is detected (affirmative result in step 82), the current coordinates of the contact locations are processed to map the contact location(s) to the display screen location. For instance, in one exemplary embodiment, this process may initially involve inverting the Xn coordinate of a digitizer output location (Xn, Yn) in order to correctly report the location pointed to on the opposite surface of the display screen. The Xn coordinate can be amended as follows. Assume that the display screen and digitizer are X pixels wide, and that the left-most column of display pixels have an X-coordinate of zero while the right-most column of the digitizer has (from the user's perspective) an X-coordinate zero. The Xn coordinate of the position indicated on the digitizer, thus, corresponds to the pixel closest to the width of the display minus the scaled x value indicated by the digitizer. The Xn coordinate can be amended based on Equation 1 below to compensate for the difference between the perspective of the display and the perspective of the digitizer in the touch panel.

$$Xn' = Xmax - Xn \qquad \text{Equ. 1}$$

Here, Xn' is an amended pixel x coordinate value, Xmax is the maximum pixel x coordinate value, and Xn is an x coordinate value given by the digitizer after scaling. The scaling factor is MAX (pixel_x_value)/MAX (digitizer_x_value). Assuming a scaling factor of 1, when the digitizer detects a coordinate value of, for example, (4, 1) and the Xmax is 10, the amended coordinate value is (6, 1).

After the inversion process, the amended coordinate pair (Xn', Yn) is processed by a display device driver or the operating system (step 85), where the amended digitizer coordinate is mapped to a locations on the display screen and a software generated pointer on the display moves to indicate the location a user is pointing to. The cursor will move to indicate the graphical user interface object to which the user is pointing. compensating for differences between large granularity digitizing of user pointing and fine granularity display by processing digitizer input as an approximation, with snapping to targets or with "gravity" to targets As the user maintains contact to the digitizer (step 86), the digitizer will continue to determine the current coordinates of the contact location on the digitizer space (step 81), and process the digitizer output (steps 84 and 85) to move the display cursor to the corresponding location on the display screen. If contact with the digitizer is broken (step 86), the routine for determining the location terminates to be re-activated at step 80 if contact is resumed.

An exemplary process for detecting and mapping discrete digitizer contact locations to graphical objects according to an exemplary embodiment will now be discussed in further detail with reference to FIG. 9. When contact with the digitizer is detected (step 90), the coordinates in the reference frame of the digitizer are determined by reading of a contact point value into a digital buffer (step 91). If a user selection event is not detected (step 92) and contact is not broken (step 93), the process continues to determine the contact point coordinate. If a selection event is detected (step 92), the handle of the graphical element in the position corresponding to a selection location code is determined (step 94). In particular, assuming a point on the digitizer has been selected, a process is performed in which the digitizer coordinate space is overlaid onto the window component location map to determine which graphical component is closest to the given contact point(s). The contact points of the digitizer output are listed in switch word active bits. After mapping the window components, the switch word active bits are used to dereference an overlay map to find the graphical element the user is addressing. Then, the handle value is sent to an operating system of the device (step 95). If contact with the digitizer is broken (step 96), the routine for determining contact location is terminated, and is re-activated (step 90) when a contact is resumed. Otherwise, a control flow continues (step 91) to determine a next coordinate pair corresponding to a current contact location.

It is to be understood that the exemplary methods discussed with reference to FIGS. 8 and 9 are just examples of different methods that may be implemented to correlate digitizer inputs with display screen regions to enable user interaction with a graphical user interface displayed on the display screen. One of ordinary skill in the art can readily envision other software or hardware means that may be applied to correlate the relationship between the digitizer measured values and the screen coordinate system or otherwise mapping graphical objects to corresponding to the digitizer measured values, without departing from the scope and spirit of this invention.

Figure 10:
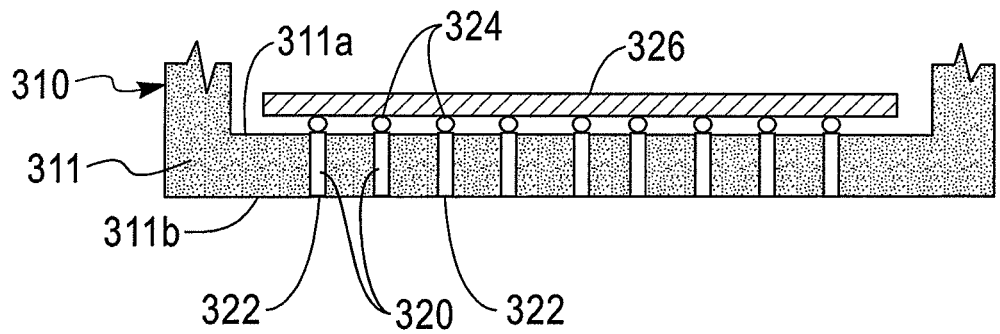
FIG. 10 is a schematic cross-sectional view of a computing device in which digitizer hardware is integrated as part of a plastic device housing, according to an exemplary embodiment of the invention.
Figure 11:
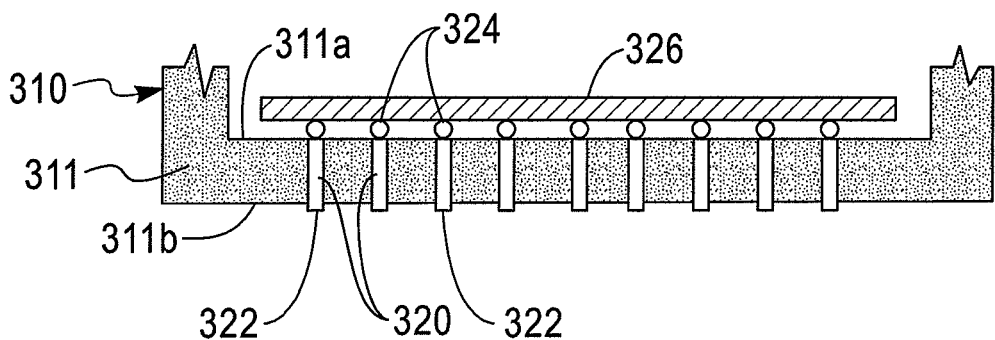
FIG. 11 is a schematic cross-sectional view of a computing device in which digitizer hardware is integrated as part of a plastic device housing, according to another exemplary embodiment of the invention.
Figure 12:
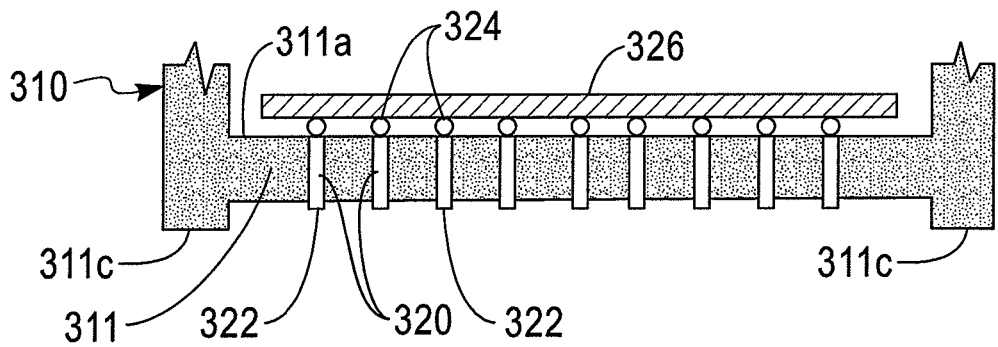
FIG. 12 is a schematic cross-sectional view of a computing device in which digitizer hardware is integrated as part of a plastic device housing, according to another exemplary embodiment of the invention.
Figure 13:
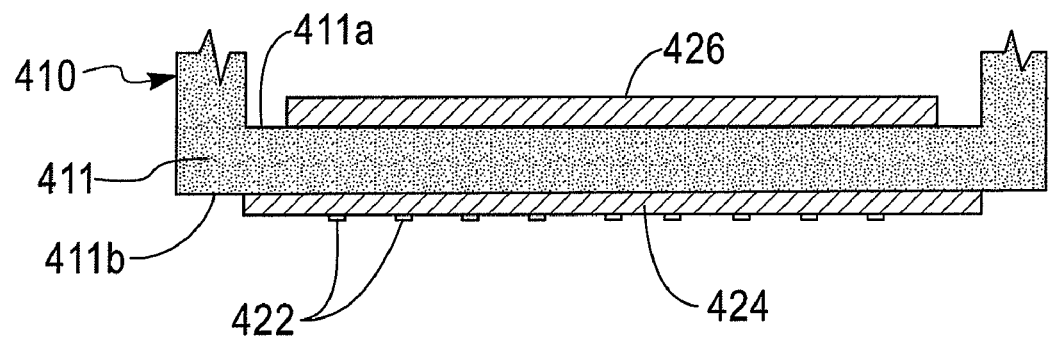
FIG. 13 is a schematic cross-sectional view of a computing device having digitizer hardware mounted on a bottom surface of a device housing according to an exemplary embodiment of the invention.
Figure 14:
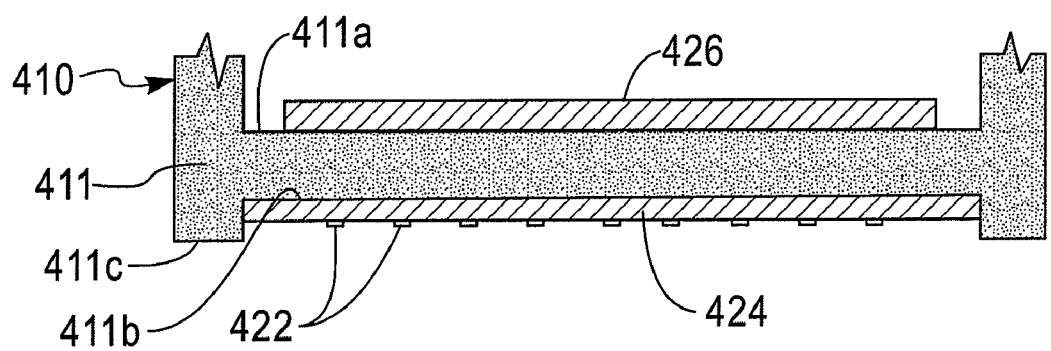
FIG. 14 is a schematic cross-sectional view of a computing device having digitizer hardware mounted on a bottom surface of a device housing according to another exemplary embodiment of the invention.

It is to be appreciated that interactive display systems according to exemplary embodiments of the invention allow for low cost digitizer solutions that can be designed and implemented independent of the type of display with structural features and arrangements that are not possible with stacked display systems such as in FIG. 1. FIGS. 10~14 schematically illustrate various methods for integrating digitizer hardware with a computing device, according to exemplary embodiments of the invention. In particular, FIGS. 10~12 are schematic cross sectional side views of computing devices in which digitizer hardware and sensor components are integrally formed as part of the device housing, according to exemplary embodiments of the invention. FIGS. 13 and 14 are schematic diagrams that illustrate methods for integrating separately formed digitizer devices with computing devices, according to exemplary embodiments of the inventions.

More specifically, FIG. 10 is a schematic cross-sectional view of a computing device (300_1) in which digitizer hardware is integrated as part of a plastic device housing (310). FIG. 10 illustrate a bottom portion (311) of the device housing (310) where a plurality of conductive electrodes (320) are embedded in the bottom portion (311) of the plastic device housing (110) extending between inner (311a) and outer (311b) surfaces of the bottom panel (311), wherein end portions (322) of the conductive electrodes (320) are exposed on the outer bottom surface (310b) of the device housing (310). The conductive electrodes (320) may be via studs that define discrete contact point electrodes that are arranged in a 2D array or other configuration (such as the contact point electrode (22) discussed above). Moreover, the conductive electrodes (322) may be part of elongated conductive electrodes structures that are used as ground rail references as discuss above.

The opposing ends of the studs (320) exposed on the inner bottom surface (310a) are exposed to make electrical connections to a circuit board (326) via solder ball connections (324), for example, which is disposed on the inner bottom surface (311a) of the device housing (310). It is to be understood that the connections to the circuit board (326) may be made using pins or other conventional well known means instead of solder balls. The circuit board (326) may be a PCB or PWB or organic build up substrate, flexible substrate, etc, having multilevel wiring structure to provide electrical connections from the embedded electrodes (320) to sensor detection circuitry, reference voltage supply terminals, etc, mounted on or otherwise connected to the circuit board (326). The circuit board (326) may have other IC chips or circuit elements mounted thereon such as embedded memory chips and microprocessors, etc, associated with the computing device.

In the exemplary embodiment of FIG. 10, the electrodes (322) may be formed using any suitable conductive material, wherein the conductive material is resistant to potential corrosion due to exposure of the exposed end contact points (322) to human contact and other environmental conditions (e.g., water). The conductive electrodes (320) may be integrally formed in the bottom surface (311) of the plastic device housing (310) using known techniques. In the exemplary embodiment of FIG. 10, the bottom surface (311b) of the device housing (310) serves as the contact sensitive surface of the digitizer, and the layout of the sensor contact array can be optimized for the intended applications of the computing device.

FIG. 11 is a schematic cross-sectional view of a computing device (300_2) according to another exemplary embodiment of the invention in which digitizer hardware is integrated as part of a plastic device housing (310). The exemplary computing device embodiment of FIG. 11 is similar to that of FIG. 10, except that the end portions (322) of the conductive electrodes (320) in the bottom (311) portion of the device housing (310) protrude past the bottom surface (311b), whereas in FIG. 10, the end portions (322) of the conductive electrode are flush with the bottom surface (311b). In the exemplary embodiment of FIG. 11, the contact electrodes (322) of the digitizer sensors are slightly raised above the touch surface (311b) to provide tactile feedback to a user. This tactile feedback is especially useful for rotary and linear slider contact electrodes that are used for specific purposes and which may not be disposed on the bottom side contact surface at locations aligned to topside GUI elements. In these and other circumstance, the tactile feedback allows a user to readily locate and manipulate the slider contact controls while looking at the topside screen.

FIG. 12 is a schematic cross-sectional view of a computing device (300_3) according to another exemplary embodiment of the invention in which digitizer hardware is integrated as part of a plastic device housing (310). The exemplary computing device embodiment of FIG. 12 is similar to that of FIG. 11 where the end portions (322) of the conductive electrodes (320) protrude past the bottom surface (311b) of bottom portion (311) of the device housing (310), except that the bottom surface (311b) in which the array of electrodes (320) are formed is recessed below a peripheral bottom surface (311c) region. In this exemplary embodiment, the bottom surface (311b) portion is recessed below the bottom peripheral surface (311c) portion to a depth such that the protruding contact ends (322) of the electrodes (320) are not subjected to possible damage when the computing device (300_3) is placed down on some dirty or rough surface, for example. Furthermore, the recessed contact surface region (311b) provides some form of tactile feedback for a user to readily determine the outer edges of the contact sensor array.

In other exemplary embodiments of the invention, digitizer devices can be separately formed hardware components that are back-side mounted to computing devices and integrated using methods and architectures such as depicted in FIGS. 13 and 14. For instance, FIG. 13 is a schematic cross-sectional view of a computing device (400_1) in which digitizer hardware is mounted on a bottom surface (411b) of a bottom portion (411) of a device housing (410). FIG. 13 illustrates a digitizer device (424) mounted to the bottom surface (411b) of the device housing (410) where a plurality of conductive contact electrodes (422) are exposed on a bottom contact surface of the digitizer (424), and a circuit board (426) mounted inside the computing device housing (410) on a bottom inner surface (411a).

The digitizer device (424) may include an internal circuit board (e.g., PCB, PWB) having a multilevel interconnect network including wiring and studs forming contact point electrodes and ground rail electrodes. The digitizer circuit board may be encased in digitizer housing where the bottom of the digitizer circuit board being exposed to provide a contact sensitive surface on which the contact electrodes are fixedly arranged, and where sensor/detector circuitry would possibly be top-side mounted on the digitizer circuit board with such circuitry interconnected to the array of contact electrodes via the multilevel wiring network in the circuit board. Moreover, the digitizer (424) could be electrically connected to embedded control circuitry and processors disposed on the circuit board (26) inside the device housing (411) using any suitable hardware interface.

FIG. 14 is a schematic cross-sectional view of a computing device (400_2) according to another exemplary embodiment of the invention. The exemplary computing device 400_2) of FIG. 14 is similar to that of FIG. 13, except that the digitizer device (424) is disposed in a recessed portion of the bottom (411) of the device housing (410). In this exemplary embodiment, the bottom surface (411b) portion is recessed below the bottom peripheral surface (411c) portion to a depth such that the digitizer (424) is not subjected to possible damage when the computing device (400_2) is placed down.

In other exemplary embodiments of the invention, the digitizer devices (424) depicted in FIGS. 13 and 14 may be printed circuit boards having a pattern of contact point electrodes and ground rail electrodes printed on one side of a substrate, which are connected to through vias that extend through the substrate and are electrically connected to a wiring pattern on the second side of the substrate. The printed wiring can be electrically connected to wiring and electrical components (e.g., sensor/detector circuitry) mounted on the internal circuit board (426) through suitable interface connections.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

I claim:

1. A computing device, comprising:
   a device housing comprising a first side and a second side opposite the first side, wherein the second side is an exterior surface of the computer device formed by the device housing; and
   an interactive display system comprising a display and a digitizer,
   wherein the display comprises a display screen disposed on the first side of the device housing and the display is exposed to an exterior of the computing device,
   wherein the digitizer comprises a plurality of conductive electrodes embedded in the device housing extending between the first side and the second side wherein a plurality of first end portions of the conductive electrodes are exposed on the second side of the computing device housing and a plurality of second end portions of the conductive electrodes are exposed to the first side of the device housing electrically connected to a circuit board disposed on the first side of the device housing, and
   wherein the digitizer is configured to detect user contact at the plurality of first end portions to drive user interaction with a GUI (graphical user interface) displayed on the display screen.

2. The device of claim 1, wherein each of the conductive electrodes corresponds to X-Y coordinate in a coordinate space of the digitizer.

3. The device of claim 2, wherein a footprint of the display screen and a footprint of the digitizer are substantially similar in area and are disposed in alignment on the opposing first and second sides of the device housing.

4. The device of claim 2, wherein a resolution of the plurality of conductive electrodes of the digitizer is less than a resolution of pixels of the display.

5. The device of claim 4, comprising:
   a sensor circuit which senses user contact with one or more of the plurality of conductive electrodes of the digitizer and which outputs a detection signal that indicates user contact at one or more detected contact points in an image space of the digitizer; an
   embedded processing system which processes the detection signal to map coordinates of the detected contact points into one or more corresponding display screen coordinates in an image space of the display screen and generates a display control signal, which is processed by the display, to enable user interaction with a graphical user interface displayed in a corresponding region of the display screen.

6. The device of claim 5, wherein the display control signal is processed to enable user control of a graphical cursor that is displayed on the display screen at the corresponding display screen coordinates.

7. The device of claim 5, wherein the display control signal is processed to enable user selection of a graphical object of the graphical user interface that is displayed on the display screen at the corresponding display screen coordinates.

8. The device of claim 7, wherein user selection of a graphical object is effected by selecting a graphical object of the graphical user interface which is displayed in a region of the display screen that includes the corresponding display screen coordinates.

9. The device of claim 7, wherein user selection of a graphical object is effected by selecting a graphical object of the graphical user interface which is displayed in a region of the display screen that is closest to the corresponding display screen coordinates.

10. The device of claim 1, wherein the plurality of first end portions of the plurality of conductive electrodes include a plurality of first contact electrodes and one or more second contact electrodes,
    wherein the first contact electrodes are arranged on the second side of the device housing at discrete contact points on a contact surface of the digitizer;
    a sensing circuit that senses user contact with one or more of the first contact electrodes at discrete contact points on the contact surface of the digitizer by detecting an electrical connections that are induced by simultaneous user contact with the one or more first contact electrodes type electrodes and at least one second-type electrode.

11. The device of claim 10, wherein the one or more second contact electrodes are arranged on the second side of the device housing in proximity to the first contact electrodes.

12. The device of claim 10, wherein the one or more second contact electrodes are disposed on the second side of the device housing such that the one or more second electrodes are in physical contact with a user's hand when using the computing device.

13. The device of claim 10, wherein sensing circuit senses user contact with a first conductive electrode detecting a change in voltage on the first contact electrode from a first reference voltage level to a second voltage reference level due to an electrical connection induced by simultaneous user contact with the first contact electrode and a second-type electrode.

14. The device of claim 10, wherein the first contact electrodes are uniformly arranged in two-dimensional array over the contact surface of the digitizer.

15. The device of claim 10, wherein the first contact electrodes are arranged in one or more separate linear arrays on the contact surface of the digitizer.

16. The device of claim 10, wherein the first contact electrodes are arranged in one or more separate annular rings on the contact surface of the digitizer.

17. The device of claim 10, wherein the first contact electrodes are arranged at discrete contact points on the contact surface of the digitizer such that one or more of the first contact electrodes are directly aligned to a graphical objected that is displayed in corresponding region of the display screen on the opposing first surface of the device housing.

18. The device of claim 1, wherein the plurality of first end portions of the conductive electrodes extend from the second side of the device housing.

19. The device of claim 18, wherein the device housing further comprises a peripheral bottom surface wherein the second side is recessed below a surface of the bottom peripheral surface and the peripheral bottom surface extends from the second side farther than the plurality of first end portions of the conductive electrodes.

20. A computing device, comprising:
  a device housing comprising a first side and a second side opposite the first side, wherein the second side is an exterior surface of the computer device formed by the device housing; and
  an interactive display system comprising a display and a digitizer,
  wherein the display comprises a display screen disposed on the first side of the device housing and the display is exposed to an exterior of the computing device,
  wherein the digitizer comprises a plurality of conductive electrodes embedded in the device housing extending between the first side and the second side wherein a plurality of first end portions of the conductive electrodes are exposed on the second side of the computing device housing and a plurality of second end portions of the conductive electrodes are exposed to the first side of the device housing electrically connected to a circuit board disposed on the first side of the device housing, and
  wherein the digitizer is configured to detect user contact at the plurality of first end portions to drive user interaction with a GUI (graphical user interface) displayed on the display screen,
  wherein the second side of the device housing and the plurality of first end portions of the conductive electrodes form a planar bottom surface of the device.

* * * * *